United States Patent [19]

Takahashi et al.

[11] Patent Number: 4,767,906
[45] Date of Patent: Aug. 30, 1988

[54] EDM WATER-BASED DIELECTRIC FLUID

[75] Inventors: Nobuyuki Takahashi, Yokohama; Shigeo Mori, Kyoto, both of Japan

[73] Assignee: Sodick Co., Ltd., Kyoto, Japan

[21] Appl. No.: 920,085

[22] Filed: Oct. 17, 1986

[30] Foreign Application Priority Data

Oct. 18, 1985 [JP] Japan .............................. 60-234324
Apr. 2, 1986 [JP] Japan .............................. 61-76935

[51] Int. Cl.$^4$ .............................................. B23H 1/08
[52] U.S. Cl. ............................... 219/69 D; 252/174.21
[58] Field of Search ................. 219/69 D; 204/129.75; 252/49.3, 49.5, 174.21, 52 R

[56] References Cited

U.S. PATENT DOCUMENTS

| | | | |
|---|---|---|---|
| 2,965,678 | 12/1960 | Sundberg et al. | 252/174.21 |
| 3,507,798 | 4/1970 | Egan et al. | 252/174.21 |
| 3,578,719 | 5/1971 | Kalopissis et al. | 252/174.21 |
| 3,666,671 | 5/1972 | Kalopissis et al. | 252/174.21 |
| 3,682,849 | 8/1972 | Smith et al. | 252/174.21 |
| 3,945,930 | 3/1976 | Sugiyama et al. | 252/49.5 |
| 3,956,401 | 5/1976 | Scardera et al. | 252/174.21 |
| 3,966,625 | 6/1976 | Tanizaki et al. | 252/52 R |
| 4,123,378 | 10/1978 | Abel et al. | 252/174.21 |
| 4,284,533 | 8/1981 | Imamura et al. | 252/174.21 |
| 4,367,129 | 1/1983 | Inoue | 219/69 D |
| 4,642,444 | 2/1987 | Inoue | 219/69 D |

FOREIGN PATENT DOCUMENTS

| | | | |
|---|---|---|---|
| 1395678 | 3/1965 | France | 252/49.3 |
| 54-35499 | 3/1979 | Japan | 219/69 D |
| 56-45331 | 4/1981 | Japan | 219/69 D |
| 181522 | 10/1983 | Japan | 219/69 D |
| 1033005 | 6/1962 | United Kingdom | 219/69 D |

OTHER PUBLICATIONS

"McCutcheon's 1982, Functional Materials", pp. 76 and 156, 06/1983.

Primary Examiner—A. D. Pellinen
Assistant Examiner—Geoffrey S. Evans
Attorney, Agent, or Firm—Millen & White

[57] ABSTRACT

There is described an electrical discharge machining medium which is a mixture of water and (a) a water-soluble compound of formula:

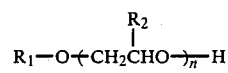

wherein $R_1$ is an alkyl group containing 1 to 6 carbon atoms; $R_2$ is a hydrogen atom, a methyl group or an ethyl group; n is an integer of 4 to 100, inclusive; or (b) a compound which contains at least one oxygen-containing hydrocarbon chain of the general formula R+O—A—H)$_m$ wherein A is a recurring oxyethylene group or a mixture of oxyethylene and one or both of oxypropylene and oxybutylene groups which do not interfere with the solubility of the compound; R is a hydrocarbon chain containing 3 to 8 carbon atoms; O is an oxygen atom forming an ether bond with a carbon atom constituting R; and m is an integer of 3 to 6, inclusive, which compound contains at least two groups of the formula —CH$_2$CH$_2$O—, has an average molecular weight not exceeding 5000, and is and remains liquid during machining, or a mixture of said compounds (a) and (b). This medium contributes to a decreased electrode consumption rate and an increased machining speed.

13 Claims, 2 Drawing Sheets

EDM WATER-BASED DIELECTRIC FLUID

BACKGROUND OF THE INVENTION

1. Field of the Invention

The present invention relates to an electrical machining medium to be interposed between an electrode and a workpiece in electrical discharge machining. In another aspect, the present invention relates to an electrical discharge machining method employing such a processing medium.

2. Description of the Prior Art

Electrical discharge machining is a production technique which comprises causing a spark discharge to take place intermittently in an insulating medium between a tool electrode and a conductive workpiece to thereby carve, drill or cut the workpiece. Because this technique is not dependent on the hardness of the workpiece and is capable of providing a machining accuracy close to mirror finish with a surface roughness of ±0.2 μm or less, it is widely used today in metal working.

Heretofore, a mineral oil (kerosene) has been mainly used as said insulating medium. However, as this mineral oil is inflammable, there is the risk of fire hazards in no-man continuous operations. Therefore, the use of pure water has been attempted recently. However, although water offers the advantage of high machining speed, it is disadvantageous in that it causes a premature electrode consumption. Recently, therefore, the addition of various auxiliary agents to water has been contemplated. For example, there has been proposed the addition of glycols such as ethylene glycol, propylene glycol, polyethylene glycol, polyalkylene glycol ether, etc., derivatives thereof, non-ionic materials such as higher alcohols, acrylamide, polyacrylamide, guar gum, etc., anionic substances such as polyacrylic acid, polymethacrylic acid, sodium alginate, etc., or cationic substances such as chitosan [See, for example, Japanese Patent Publication No. 59-4253.]

However, even with such contrivances, the electrode consumption rate can be reduced only by 3 percent at best [See FIG. 2 of the above publication]. However, in order to assure a sufficient machining accuracy in carving or drilling, it is an absolute requirement that the electrode consumption rate is less than 1 percent at most. Therefore, all of the conventional aqueous media are unsatisfactory for practical purposes.

SUMMARY OF THE INVENTION

It is an object of the present invention to provide an aqueous electrical machining medium which features a remarkably low electrode consumption rate which is not increased beyond one percent on prolonged continuous use.

Other objects and advantages of the present invention will become apparent from the detailed description that follows.

The present invention is concerned with an aqueous electrical discharge machining medium comprising: (a) a compound of the general formula

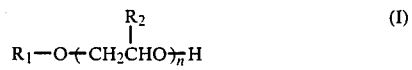
(I)

wherein $R_1$ is an alkyl group containing 1 to 6 carbon atoms; $R_2$ is a hydrogen atom, a methyl group or an ethyl group; n is an integer of 4 to 100, inclusive; or (b) a compound which contains at least one oxygen-containing hydrocarbon chain of the general formula $-R-(O-A-H)_m$ wherein A is a recurring oxyethylene group or a mixture of oxyethylene and one or both of oxypropylene and oxybutylene groups which do not interfere with the solubility of the compound; R is a hydrocarbon chain containing 3 to 8 carbon atoms; O is an oxygen atom forming an ether bond with a carbon atom constituting R; and m is an integer of 3 to 6, inclusive, which compound contains at least two groups of the formula $-CH_2CH_2O-$, has an average molecular weight not exceeding 5000, and is and remains liquid during machining, or (c) a mixture of said compounds (a) and (b).

DETAILED DESCRIPTION OF THE PREFERRED EMBODIMENTS

Figure 1:
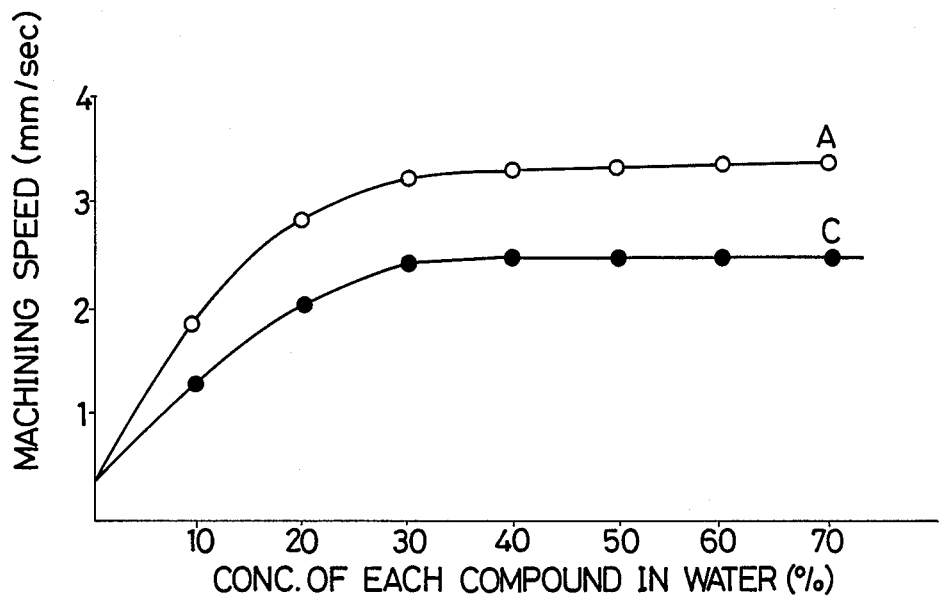
FIG. 1 through FIG. 3 are graphs comparing the machining medium of the present invention with the conventional medium in carving speed and electrode consumption rate.

Referring to the above-mentioned compound (a), $R_1$ may for example be methyl, ethyl, propyl, isopropyl, butyl, isobutyl, tert-butyl or the like. As stated above, $R_2$ is selected from hydrogen, methyl and ethyl. The compound (a) may contain different species of $R_2$ in the same molecule.

The oligo- or polyoxyalkylene group of the general formula

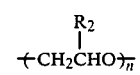

preferably has a degree of polymerization in the range of n=4 to 100 (average). If the value of n is less than 4, the electrode consumption rate cannot be reduced sufficiently. If n is in excess of 100, the aqueous solution is increased in viscosity to the extent of interfering with the machining operation. Accordingly, the following compounds may be mentioned as examples of compound (a).

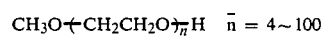

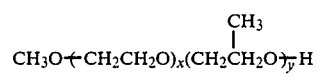

$\bar{x} + \bar{y} = \bar{n}; \quad \bar{n} = 4 \sim 100$

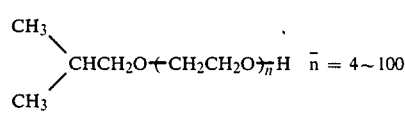

Examples of the hydrocarbon group $R-O-A-H)_m$ compound (b) are residues of polyols containing 3 to 6 carbon atoms, such as

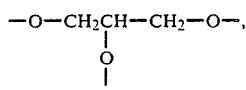

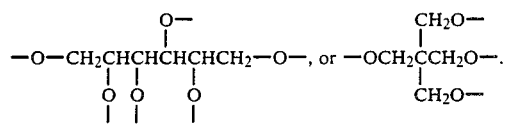

The compound (b) should contain at least one of such hydrocarbon chains. Furthermore, while the compound (b) contains oxyethylene groups attached to the above-mentioned hydrocarbon chain, it may additionally contain other oxyalkylene groups such as oxypropylene and oxybutylene groups up to the extent not interfering with water solubility. Incidentally, a compound (b) in which oxyethylene and oxypropylene groups are attached in random fashion has a desirable characteristic of low pour point but the availability of such characteristic is not directly relevant to the concept of the present invention.

The compound (b) should have an average molecular weight of less than 5000. If the average molecular weight exceeds 5000, the aqueous solution will be increased in viscosity to the extent interferring with the attainment of the object.

Further, compound (b) should be a liquid at the machining temperature. If it is not liquid during machining, splashes of the aqueous solution may dry up and solidify to cause clogging of the wire guard and other troubles.

The structures of representative high molecular compounds (b) are shown below in general formulas.

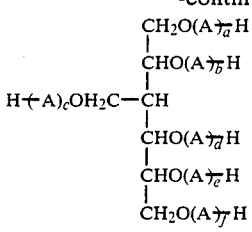 Conpound group B-1

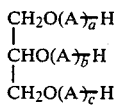 Compound group B-2

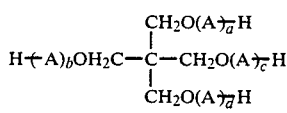 Compound group B-3

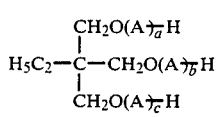 Compound group B-4

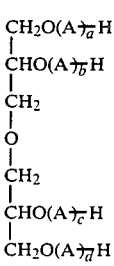 Compound group B-5

In the above general formulas, the symbol A means the residue of an oxyalkylene group which may be either oxyethylene or a mixture of oxyethylene and oxypropylene and/or oxybutylene; a through f mean the same or different integers corresponding to the molecular weight of the respective polyoxyalkylene units in each compound.

In the practice of the present invention, the compound (a) and compound (b) can be employed either individually or in combination.

The electrical discharge machining medium of the present invention is prepared in the following manner. First, water is treated with an ion exchange resin to a resitivity of $10^4$ ohms-cm or more and, then, an appropriate amount of compound (a), compound (b) or a mixture thereof is added. The mixture is stirred to give a homogeneous solution. The preferred concentration is 0.5 to 65 weight percent. If necessary, a rust inhibitor may be added in a small amount. In the above procedure, the ion exchange treatment may be carried out as a final step.

EXAMPLES

The following examples are intended to illustrate the present invention in further detail and should by no means be construed as limitative of the invention.

EXAMPLE 1

Preparation of the machining medium

The compound indicated in Table 1A or Table 1B was dissolved in water and passed over an ion exchange resin to give a resistivity of $2 \times 10^5$ ohms-cm. This solution is used as a test machining medium.

TABLE 1A

| Number | | $\bar{n}$ |
|---|---|---|
| A-1 | $CH_3O(CH_2CH_2O)_{\overline{n}}H$ | 10 |
| A-2 | $(CH_3)_2CHCH_2O(CH_2CH_2O)_{\overline{n}}H$ | 15 |
| A-3 | $CH_3O(CH_2CH_2O)_x(CH_2CHO)_{\overline{y}}H$ with $CH_3$; $\bar{x}=10; \bar{y}=5$ | $\bar{x}+\bar{y}$ |
| C-1 | $HO(CH_2CH_2O)_{\overline{n}}H$ (Control) | 10 |
| C-2 | $HO(CH_2CH_2O)_{\overline{n}}H$ (Control) | 2 |

TABLE 1B

| Compound No. | Average molecular weight | Composition of A (%) (% of total oxyalkylene)@ | | | State at machining temperature |
|---|---|---|---|---|---|
| | | Oxyethylene | Oxypropylene | Oxybutylene | |
| B-1 | 1500 | 75 | 25 | 0 | Liquid |
| B-2 | 4000 | 80 | 0 | 20 | Liquid |

TABLE 1B-continued

| Compound No. | Average molecular weight | Composition of A (%) (% of total oxyalkylene)@ | | | State at machining temperature |
| --- | --- | --- | --- | --- | --- |
| | | Oxyethylene | Oxypropylene | Oxybutylene | |
| B-3 | 600 | 100 | 0 | 0 | Liquid |
| B-4 | 1000 | 100 | 0 | 0 | Liquid |
| C-1* | 1000 | 100 | 0 | 0 | Solid |
| C-2* | 2000 | 100 | 0 | 0 | Solid |

*Polyethylene glycol
@Mean number per molecule

TEST CONDITIONS

The test conditions are shown in Table 2.

TABLE 2

| Machine used | SODICK A5C (Sodick Co., Ltd.) | | |
| --- | --- | --- | --- |
| Electrode | Graphite ED-3 Hemispherical | | |
| Workpiece | SKD-61 | | |
| Electrical conditions | Voltage | (V) | 35 |
| | Current | (A) | 40 |

RESULTS

Figure 2:
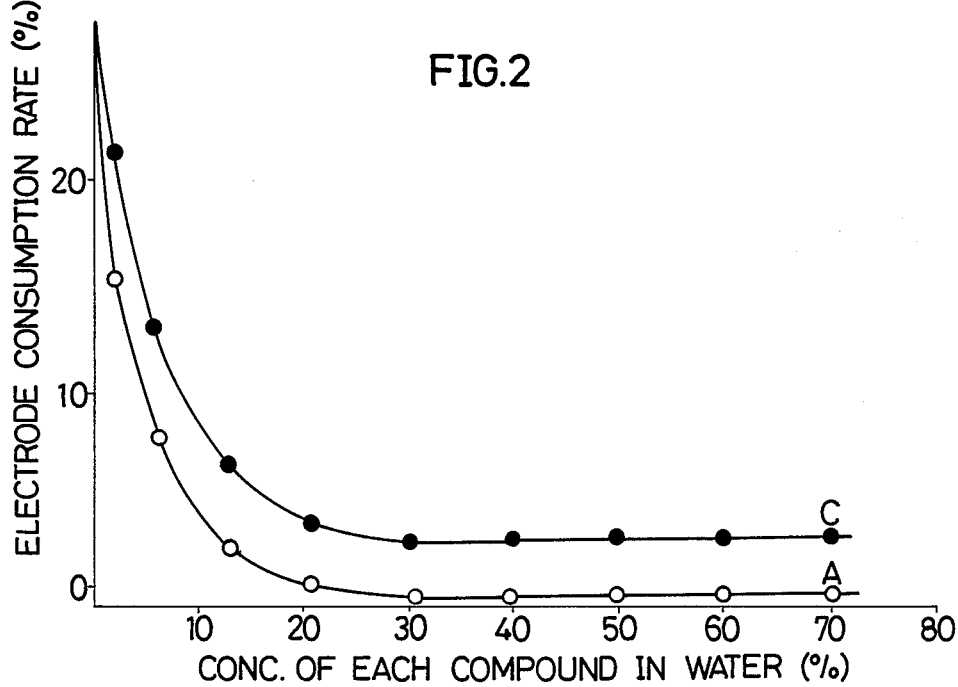
Figure 3:
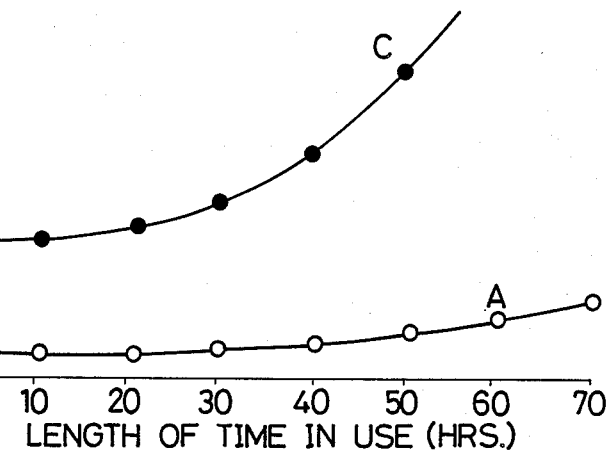

As apparent from Curves A in FIG. 1 through FIG. 3, the electrical discharge machining solutions incorporating compounds A-1 through A-3 and B-1 through B-4, among the compounds shown in Table 1-A and Table 1-B, are by far superior to control compounds C-1 and C-2 in all of machining speed, electrode consumption rate and durability.

EXAMPLE 2

The compounds mentioned in Table 1-A and Table 1-B were dissolved in ion-exchanged pure water and using these solutions, wire cutting was performed under the following conditions.

| Machine used | SODICK 330-W (Sodick Co., Ltd.) |
| --- | --- |
| Electrode | Wire FKH, 0.2 mm dia. |
| Workpiece | SKD-11, 20 mm thick |
| Machining conditions: | |
| Wire feed | 5 m/min. |
| Resistivity of medium | $3 \times 10^4$ ohms-cm |
| Voltage | 35 V |
| Current | 10 A |

Figure 4:
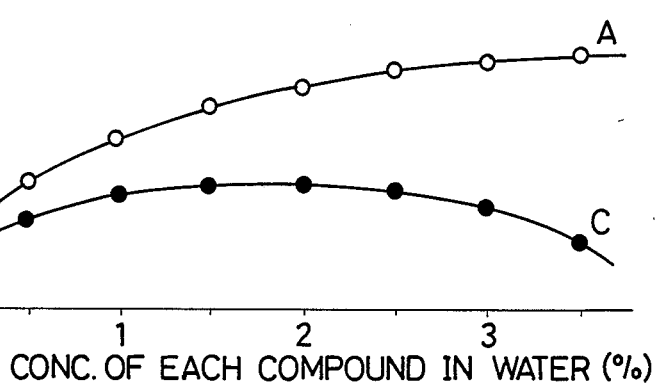
FIG. 4 is a graph comparing the machining medium of the present invention with the conventional medium in wire cutting speed. In each drawing, the curve A (-O-) represents the use of a compound of the invention and the curve C (-●-) represents the use of a control compound.

The results are shown in FIG. 4. Among the compounds indicated in Table 1-A and Table 1-B, machining media incorporating the compounds A-1 through A-3 and B-1 through B-4 are by far superior to control machining media containing control compounds C-1 and C-2.

Thus, the electrical discharge machining medium according to the present invention is markedly superior to the hitherto-known aqueous media not only in electrode consumption rate but also in machining speed and durability. Consequently, the technique contributes remarkably to the progress of metal machining technology.

What is claimed is:

1. In an electric discharge machining method which comprises inducing an intermittent spark discharge between a machining electrode and a conductive electrode in an aqueous insulating medium which is an electrical discharge machining medium, the improvement which comprises employing an insulating medium which reduces electrode consumption and which consists essentially of an amount from 0.5 to 65 weight % of (a) a water-soluble compound of the following general formula

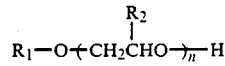

wherein $R_1$ is an alkyl group containing 1 to 6 carbon atoms; $R_2$ is a hydrogen atom, a methyl group or an ethyl group; n is an integer of 4 to 100, inclusive; or (b) a compound which contains at least one oxygen-containing hydrocarbon chain of the general formula $R$―$(O$―$A$―$H)_{\overline{m}}$ wherein A is a recurring oxyethylene group or a mixture of oxyethylene and one or both of oxypropylene and oxybutylene groups which do not interfere with the solubility of the compound; R is a hydrogen chain containing 3 to 8 carbon atoms; O is an oxygen atom forming an ether bond with a carbon atom constituting R; and m is an integer from 3 to 6, inclusive; which compound contains at least two groups of the formula ―$CH_2CH_2O$―, has an average molecular weight not exceeding 5000, and is and remains liquid during machining, or (c) a mixture of compounds (a) and (b).

2. The electric discharge machining method of claim 1 wherein said insulating medium has a resistivity of at least $10^4$ ohms-cm.

3. An aqueous electrical discharge machining medium which reduces electrode consumption and which consists essentially of water and an amount from 0.5 to 65 weight % of (a) a water-soluble compound of the following general formula

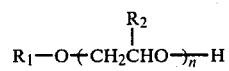

wherein $R_1$ is an alkyl group containing 1 to 6 carbon atoms; $R_2$ is a hydrogen atom, a methyl group or an ethyl group; n is an integer of 4 to 100, inclusive; (b) a water-soluble compound which contains at least one oxygen-containing hydrocarbon chain of the general formula $R$―$(O$―$A$―$H)_{\overline{m}}$ wherein A is a recurring oxyethylene group or a mixture of oxyethylene and one or both of oxyethylene and oxybutylene groups which do not interfere with the solubility of the compound; R is a hydrogen chain containing 3 to 8 carbon atoms; O is an oxygen atom forming an ether bond with a carbon atom constituting R; and m is an integer from 3 to 6, inclusive; which compound contains at least two groups of the formula ―$CH_2CH_2O$―, has an average molecular weight not exceeding 5000, and is and remains liquid during machining, or (c) a mixture of compounds (a) and (b).

4. The electrical discharge medium of claim 3 which has a resistivity of at least $10^4$ ohms-cm.

5. The electrical discharge medium of claim 4 which comprises compound (a) as the essential component.

6. The electrical discharge medium of claim 5 which comprises as compound (a) the compound of the formula $CH_3O$―$(CH_2CH_2O)_nH$ wherein n = 10.

7. The electrical discharge medium of claim 6 which comprises as compound (a) the compound of the formula $(CH_3)_2CHCH_2O$―$(CH_2CH_2O)_{\overline{n}}$ wherein n = 15.

8. The electrical discharge medium of claim 6 which comprises as compound (a) the compound of the formula

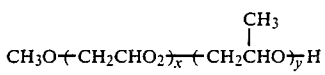

wherein x=10 and y=5.

9. The electrical discharge medium of claim 4 which comprises compound (b) as the essential component.

10. The electrical discharge medium of claim 9 which comprises as compound (b) a compound of a molecular weight of about 1,500 and 75% of whose oxyalkylene groups are oxyethylene and 25% of which are oxypropylene.

11. The electrical discharge medium of claim 9 which comprises as compound (b) a compound of a molecular weight of about 4,000 and 80% of whose oxyalkylene groups are oxyethylene and 20% of which are oxybutylene.

12. The electrical discharge medium of claim 9 which comprises as compound (b) a compound of a molecular weight of about 600 and whose oxyalkylene groups are oxyethylene.

13. The electrical discharge medium of claim 9 which comprises as compound (b) a compound of a molecular weight of about 1,000 and whose oxyalkylene groups are oxyethylene.

* * * * *